United States Patent [19]

Benton

[11] 4,016,417
[45] Apr. 5, 1977

[54] LASER BEAM TRANSPORT, AND METHOD

[76] Inventor: Richard Glasscock Benton, 1300 St. Joseph Prof. Bldg., Houston, Tex. 77002

[22] Filed: Jan. 8, 1976

[21] Appl. No.: 647,609

[52] U.S. Cl. .............................. 250/251; 137/802; 417/572
[51] Int. Cl.$^2$ ................... G01N 27/28; H01S 1/00; H01S 9/00; F04B 21/00
[58] Field of Search ............ 231/94.5 G; 250/251, 250/423 P; 137/802; 417/572

[56] References Cited

UNITED STATES PATENTS

| | | |
|---|---|---|
| 3,683,297 | 8/1972 | Hobart et al. ................ 331/94.5 G |
| 3,808,432 | 4/1974 | Ashkin et al. .................... 250/251 |

*Primary Examiner*—Alfred E. Smith
*Assistant Examiner*—T. N. Grigsby
*Attorney, Agent, or Firm*—Ranseler O. Wyatt

[57] ABSTRACT

This invention relates to a method of transport of vaporized matter by laser beam, and the equipment to practice the method. The vaporized material is introduced into the laser beam at the point of generation of the beam, and conveyor junctions are provided, such as prisms, having passageways therethrough, the prisms deflecting the beam and the passageways therethrough being the center of the beam for passage of vapors with the beam. The walls of the beam will retain the vapor and, as the vapor particles and molecules are deflected from the hotter areas of the laser beam wall, which are maintained hot through the entire length at a temperature appropriate to maintain a vaporous state, toward areas of less heat and less resistance, the vapor will move toward the open end, or destination; upon reaching its destination, the vapors will pass through the mirror customarily employed to reflect the beam, which will be provided with a passageway therethrough to permit the flow of vaporized matter therethrough into a condenser which will transform the vapor into liquid. The same mechanism may be employed to separate particulate matter entrapped in the vapor which will be precipitated out through the wall of the beam at distances relative to the particle mass, when the beam is more or less parallel with the earth surface. Spaced collection chambers may be utilized to collect and maintain separation of such particulate matter.

6 Claims, 3 Drawing Figures

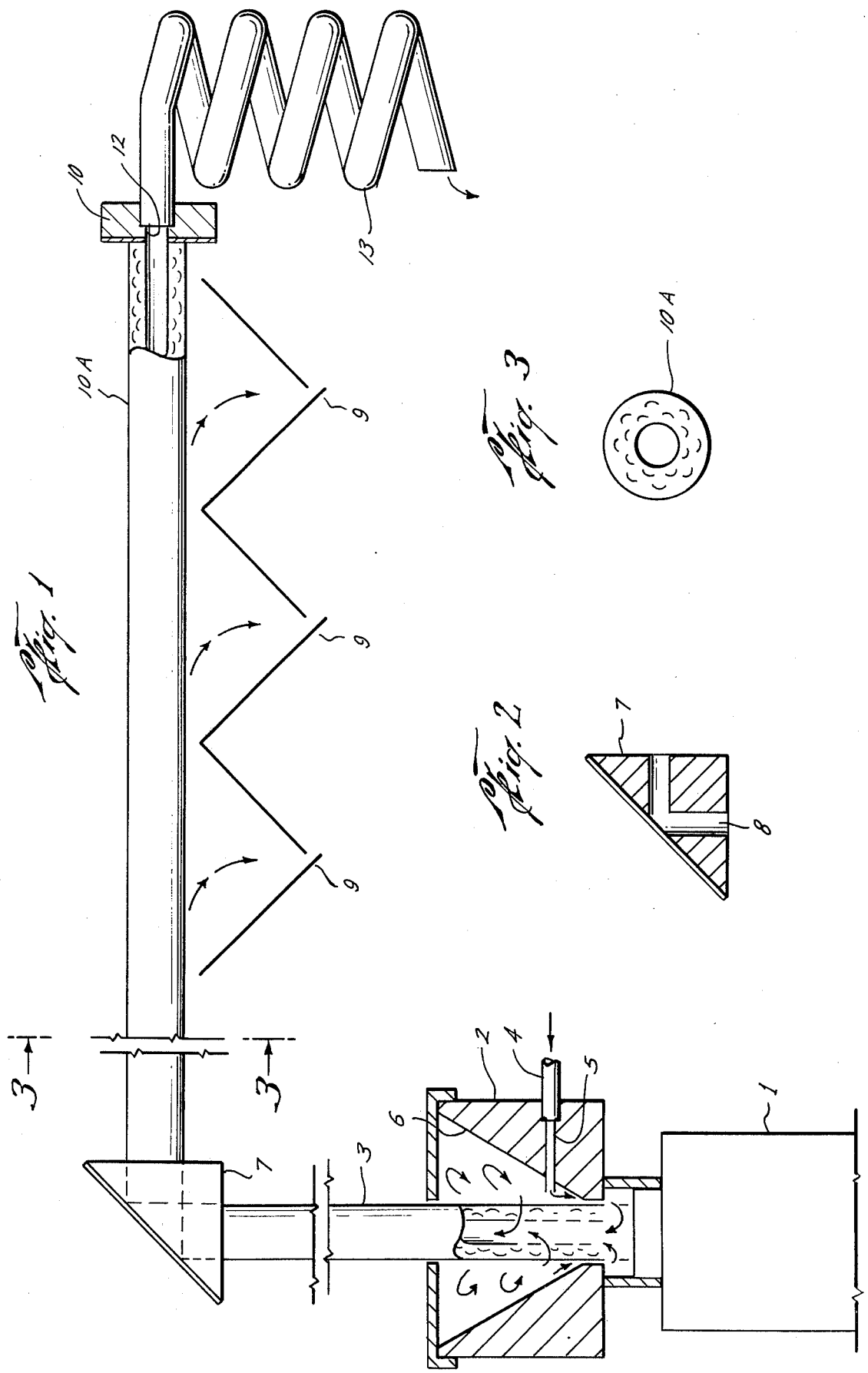

LASER BEAM TRANSPORT, AND METHOD

SUMMARY OF THE INVENTION

A laser transport method and equipment to practice same, having a conical chamber for introduction of vaporized matter into a laser beam at the point of generation, and having conveyor junctions for directing and redirecting the laser beam and throught which the vapor passes in its travel within the laser beam, said conveyor junctions having means for moving the vapor through the beam in a predetermined direction within the outer confines, or peripheral surface, of the beam, maintaining the vapor temperature and velocity, and having a reflecting member at the destination of the beam, with a passageway therethrough for passage of the vapor into a receiving chamber. Said transport having spaced collectors beneath the horizontal pathway of the beam to receive particulate precipitation.

BRIEF DESCRIPTION OF THE DRAWINGS

FIG. 1 is a drawing of the instant invention.
FIG. 2 is a detail of element 7 of FIG. 1.
FIG. 3 is a sectional view along line3—3 of FIG. 1.

In the drawings, the numeral 1 designates a laser beam generator on which is mounted the vapor receiver 2, which has a conical chamber, with the small end of the cone terminating adjacent the open end of the laser beam conduit 3. Vapor is generated from any suitable source (not shown) and introduced into the receiver through the conduit 4, which has a flow connection with the passageway 5 and into the concial chamber 6. The beam conduit 3 is redirected at the prism, or conveyor junction, 7, which has the passageway 8 therethrough, and there are spaced particulate collectors 9, 9 beneath the beam pathway at selected intervals.

The laser beam is projected from the conveyor junction 7, and redirected in its original pattern and configuration from the prism. The vapor is introduced into the laser beam at an appropriate velocity, and the horizontal position of the beam will tend to maintain the speed of travel of the vapor, especially as expanding gases seek routes of least resistance.

The thickness of the wall of the projected beam may be controlled be well known methods, and, if desired, a wall thickness of the beam may be employed which will permit particulate matter entrapped in the vapor to precipitate throught the wall dring its horizontal travel, and the mass of the particulate matter will cause the greater particles to fall first through the wall of the beam, to be gathered by the containers 9, and the lesser weights to be progressively precipitated, so that the particulate matter will be separated by mass.

The vapor passes through the conveyor junctions by means of the passageway 8, which may consist of an orifice formed through the center of the prism. Opaque patterns upon the face of the laser crystal 1 will result in patterns being projected from the original source, the prism allowing the beam to be bent to control the direction of the beam, and in as much as the light is coherent, it will be a beam with no spread of wavelengths. The passageway through the prism permits the vapor to follow the beam.

At the point of destination, the travel of the beam is terminated, and/or the beam is reflected by means of a reflector as 10. A passageway 12 through the reflector 11 permits the vapor to pass through the reflector into a suitable condenser, as 13, for recovery.

The method taught by this invention is the generation of a tubular laser beam, and the introduction of a vapor therein at a velocity sufficient to facilitate its speedy travel, and pulsing the inner bands of heat in the beam, and causing the vapor to contact the inner walls of the beam as the longitudinal travel continues, maintaining the velocity and temperature of the transported vapor; spiraling the turbulent vapor and collecting the vaporized matter at the laser beam destination. The method also teaches the introduction of vaporized maater having entrapped particulate matter, which will be precipitated through the wall of the beam according to the mass of the particulate, and gathered in spaced containers positioned at intervals along the longitudinal path of the beam.

What I claim is:

1. In a laser transport, a laser beam generator, a tubular laser beam generated thereby, means for introduction of a vapor into said beam, conveyor joints for directional control of the longitudinal movement of said beam, passageways through said conveyor joint for the passage of said vapors with the projection of said beam.

2. The device defined by claim 1 having reflectors at the terminal point of the beam, a passageway through said reflectors for the passage of the vapor therethrough and collectors at said terminal point for collecting said vapor.

3. The device defined in claim 1 wherein said joint conveyors redirect the coherant light of the beam.

4. The device defined in claim 1 wherein said means for introduction of a vapor into said beam comprises a vapor receiver, a conical chamber in said receiver, the small end of said chamber terminating adjacent the open end of said beam.

5. The device defined by claim 1 wherein opaqued areas in the laser projection means determines the flow pattern of the inside wall of said beam.

6. The method of laser transport wherein a tubular laser beam is generated, vapors are introduced at high velocity into said beam, and the flow pattern of said vapors are directed to initiate repeated contact with the inside walls of said beam to maintain the temperature and velocity of said vapors, and said vapors are collected at the terminal point of said beam.

* * * * *